D. M. FRANCISCO.
STALK PULLER.
APPLICATION FILED APR. 25, 1910.

973,188.

Patented Oct. 18, 1910.

Witnesses
Luella Greenfield
Phina Woodruff

Inventor
Dudley M. Francisco
By
Attorneys

UNITED STATES PATENT OFFICE.

DUDLEY M. FRANCISCO, OF KALAMAZOO, MICHIGAN.

STALK-PULLER.

973,188.  Specification of Letters Patent.  Patented Oct. 18, 1910.

Application filed April 25, 1910. Serial No. 557,380.

*To all whom it may concern:*

Be it known that I, DUDLEY M. FRANCISCO, a citizen of the United States, residing at Kalamazoo, Michigan, have invented certain new and useful Improvements in Stalk-Pullers, of which the following is a specification.

This invention relates to an improved implement, adapted for use as a weed puller, plant lifter or transplanter.

The main objects of this invention are to provide an improved implement adapted for use as a weed puller, plant lifter or transplanter which is effective for the purpose and, at the same time, is very simple and economical in structure.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 2:
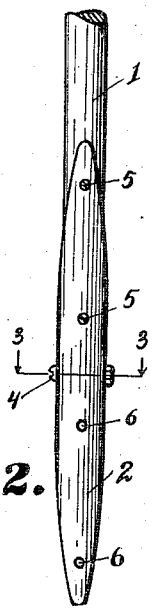
Figure 3:
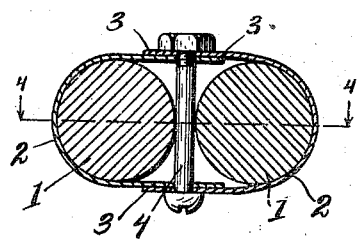
Figure 1:
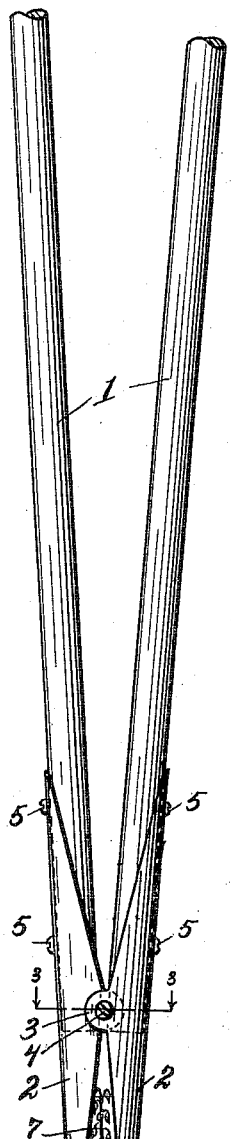
Figure 4:
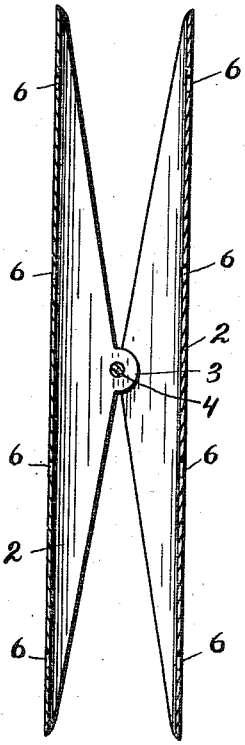

A structure constituting an effective and preferred embodiment of the features of my invention is clearly illustrated in the accompanying drawing, forming a part of this specification, in which:

Figure 1 is a detail side elevation of my improved implement, the same being shown inserted in the ground for the purpose of lifting a plant shown in connection therewith. Fig. 2 is a detail elevation of my improved implement looking from the right of Fig. 1. Fig. 3 is an enlarged transverse section taken on a line corresponding to lines 3—3 of Figs. 1 and 2, the pivot being shown in full lines. Fig. 4 is a vertical section through the jaws, taken on a line corresponding to line 4—4 of Fig. 3.

In the drawings, similar reference characters refer to similar parts throughout the several views, and the sectional views are taken looking in the direction of the little arrows at the ends of the section lines.

Referring to the drawing, the handles 1 are preferably formed of wood, and are of convenient length to enable the use of the tool when a person is standing upright. A pair of opposed jaws, 2, 2, are provided, these jaws being formed of sheet metal, curved in cross section and tapered toward each end, and having opposed pivot ears 3 on their edges. The jaws are pivotally connected by means of the pivot 4, which, in the structure illustrated, is a stove bolt. The handles are fitted into the upper ends of the jaws and secured therein by means of screws or rivets, as 5, the lower ends of the handles being extended below the pivot and in bearing contact therewith, so that the strain on the fastenings in the operation of the implement is comparatively slight. The jaws are provided with a series of holes 6, so that they can be reversed, thus enabling the use of both ends.

My improved implement is adapted for use as a weed puller, a plant lifter or transplanter. In Fig. 1 I show the jaws inserted in the ground to lift a plant, as 7. In lifting the plant, or pulling weeds, the jaws are inserted in the ground and the handles spread, which forces the jaws together, when the plant or weed is lifted from the ground or pulled.

When used as a transplanter, the jaws are re-inserted in the ground before spreading to release the plant, and after being inserted, are spread and lifted, leaving the plant in the ground. When used on plants of a size to which the implement is adapted, they can be transplanted with little disturbance to their roots.

The implement is desirable for pulling weeds from lawns or the like, as the paws can be inserted in the ground close to the root, and closed up thereon and the weed pulled or lifted with little disturbance to the surrounding earth.

My improved tool or implement is very economical to produce and is light and convenient to use. By arranging the parts as I have illustrated and described, the tool is strong and durable, although made of light material.

Having thus described my invention, what I claim as new and desire to secure by Letters Patent is:

1. A tool of the class described, comprising a pair of handles, a pair of opposed reversible jaws formed of sheet metal, said jaws being curved in cross section and tapered toward each end and provided with centrally-disposed pivot ears on their edges, and a pivot for said ears, the said handles being fitted into and secured to the upper ends of said jaws with their lower ends extending below and in bearing contact with said pivot.

2. A tool of the class described, comprising a pair of handles, a pair of opposed jaws, said jaws being curved in cross section and provided with centrally-disposed pivot ears on their edges; and a pivot for said ears, the said handles being fitted into and secured to the upper ends of said jaws with ther lower ends extending below and in bearing contact with said pivot.

3. A tool of the class described, comprising a pair of handles, a pair of opposed reversible jaws formed of sheet metal, said jaws being curved in cross section and tapered toward each end and provided with centrally-disposed pivot ears on their edges, and a pivot for said ears, the said handles being detachably secured to the upper ends of said jaws.

In witness whereof, I have hereunto set my hand and seal in the presence of two witnesses.

DUDLEY M. FRANCISCO. [L. S.]

Witnesses:
LUELLA G. GREENFIELD,
PHINA WOODRUFF.